United States Patent [19]

Roberts et al.

[11] Patent Number: 5,531,305
[45] Date of Patent: Jul. 2, 1996

[54] SYNCHRONIZER CLUTCH ASSEMBLY FOR MULTIPLE RATIO GEARING

[75] Inventors: Keith Roberts, Maesteg; Christopher D. Thomas, Swansea; James L. Lamin, Bridgend; Gary I. Skipper, Swansea; Jonathan G. Larsen, Bridgend, all of Wales

[73] Assignee: Borg-Warner Automotive, Inc., Sterling Heights, Mich.

[21] Appl. No.: 278,860

[22] Filed: Jul. 26, 1994

Related U.S. Application Data

[63] Continuation-in-part of Ser. No. 147,618, Nov. 5, 1993, abandoned.

[51] Int. Cl.$^6$ ..................................................... F16D 23/06
[52] U.S. Cl. .......................... 192/53.332; 192/53.34; 192/53.364
[58] Field of Search .................... 192/53 F, 53 E, 192/53 C, 53.332, 53.34, 53.342, 53.364

[56] References Cited

U.S. PATENT DOCUMENTS

| | | | |
|---|---|---|---|
| 2,190,964 | 2/1940 | White. | |
| 2,364,331 | 12/1944 | White. | |
| 3,700,083 | 10/1972 | Ashikawa et al. | 192/53 F |
| 4,584,892 | 4/1986 | Hiraiwa et al. | 74/339 |
| 4,809,832 | 3/1989 | Inui | 192/53 |
| 4,828,087 | 5/1989 | Kudo et al. | 192/53 |
| 4,830,158 | 5/1989 | Uno et al. | 192/53 |
| 4,842,112 | 6/1989 | Inui | 192/53 |
| 4,875,566 | 10/1989 | Inui et al. | 192/53 |
| 4,889,003 | 12/1989 | Rietsch | 74/339 |
| 5,036,719 | 8/1991 | Razzacki. | |
| 5,113,986 | 5/1992 | Frost | 192/53 |
| 5,131,285 | 7/1992 | Weismann et al. | 74/333 |
| 5,269,400 | 12/1993 | Fogelberg | 192/53 |
| 5,339,936 | 8/1994 | Lauer et al. | 192/53 |
| 5,377,800 | 1/1995 | Sperduti et al. | 192/53 F X |

FOREIGN PATENT DOCUMENTS

| | | |
|---|---|---|
| 0167319 | 1/1986 | European Pat. Off. . |
| 0272134 | 6/1988 | European Pat. Off. . |
| 1343412 | 10/1963 | France . |
| 2268986 | 11/1975 | France . |
| 2470897 | 6/1981 | France . |
| 1065282 | 9/1959 | Germany . |
| 955937 | 4/1964 | United Kingdom . |

OTHER PUBLICATIONS

Patent Abstracts of Japan, vol. 9, No. 303 (M-434) (2026) 30 Nov. 1985 and JP-A-60 139 919 (Toyota) 24 Jul. 1985 Abstract.

*Primary Examiner*—Andrea L. Pitts
*Attorney, Agent, or Firm*—Brooks & Kushman; Greg Dziegielewski

[57] ABSTRACT

A synchronizer clutch assembly for a manual transmission comprising a synchronizer hub carried by a torque delivery shaft and including a cone clutch member carried by a gear forming a part of the transmission gearing and a synchronizer blocker ring adapted to be made of forged steel, the synchronizer assembly including a shiftable clutch sleeve that is engageable with at least one spring element secured to the synchronizer blocker ring whereby the blocker ring cone clutch frictionally engages the cone clutch of the gear upon movement of the sleeve toward an engagement position until the rotary motion of the gear is brought into synchronism with the rotary motion of the shaft.

11 Claims, 6 Drawing Sheets

SYNCHRONIZER CLUTCH ASSEMBLY FOR MULTIPLE RATIO GEARING

CROSS-REFERENCE TO RELATED APPLICATION

This application is a continuation-in-part of U.S. application Ser. No. 08/147,618, filed Nov. 5, 1993, now abandoned.

TECHNICAL FIELD

This invention relates to automotive transmissions and to synchronizer clutches for controlling ratio changes in transmission gearing.

BACKGROUND OF THE INVENTION

Our invention comprises improvements in a synchronizer clutch assembly for a manual transmission such as the synchronizer clutch assemblies disclosed in prior art U.S. Pat. Nos. 2,221,900 and 3,366,208, which are assigned to the assignee of our present invention. It is an improvement also in the synchronizer assembly disclosed in pending patent application Ser. No. 08/116,780, filed Sep. 3, 1993, by Keith Roberts and Jonathan Larsen, two of the co-inventors in the present application. The copending application also is assigned to the assignee of the present invention.

Synchronizer clutch assemblies for manual transmissions typically include an intermediate torque transfer shaft situated between a torque input shaft and a transmission torque output shaft. Located in parallel disposition with respect to the intermediate shaft is a cluster gear assembly. Torque delivery gears of different pitch diameter may be journalled on the intermediate shaft, and a synchronizer clutch assembly is disposed adjacent one of the gears or between two adjacent gears. The synchronizer clutch assembly functions to drivably connect the torque delivery gears for rotation in unison or to connect one or both of the gears selectively to the intermediate shaft. The synchronizer clutch assembly synchronizes rotary motion of the gears, one with respect to the other, or rotary motion of one or both of the gears selectively with respect to the intermediate shaft prior to the establishment of a driving connection between the rotary members.

The previously described '900 patent includes a synchronizer clutch hub that is splined to the intermediate shaft at a location between two gears of different pitch diameter. A clutch sleeve with internal clutch teeth is mounted for axial sliding movement on the synchronizer hub. The gear to be synchronized with respect to the shaft carries external clutch teeth as well as an external clutch surface. A synchronizer clutch blocker ring of that prior art design is disposed between the sleeve and the external clutch teeth of the gear. The blocker ring is formed with an internal cone surface adapted to engage the external cone surface of the gear.

Thrust bars arranged within the sleeve of the prior art designs are engageable with the synchronizer ring when the clutch sleeve is moved toward the engaged position. A detent force created by detent elements on the thrust bars and the clutch sleeve creates a synchronizer blocker ring clutch engaging force that causes the blocker ring to index angularly with respect to the clutch hub. This indexing motion is established by a lost motion connection between the blocker ring and the clutch hub.

Chamfered external blocker ring teeth formed on the blocker ring are in axial alignment with chamfered ends on the internal clutch sleeve teeth. When the chamfered ends on the teeth of the blocker ring and the sleeve engage, a clutch engaging force is established that causes synchronism in the motion of the gear with respect to the intermediate shaft. When synchronism is established, the sleeve may be moved through the blocker ring teeth into engagement with the external gear teeth with a smooth engaging action.

The detent force that is created upon initial movement of the sleeve in the construction of the '900 patent is established by a spring force acting in a radial direction on the thrust bars. The overall clutch assembly including the thrust bars, the springs, the sleeve and the synchronizer blocker ring is a relatively complex construction and inherently is more costly than a clutch assembly that does not require synchronizing action, such as positive drive dog clutch teeth.

Prior art patent '208 has features that are common to prior art patent '900, but it includes a pair of clutches rather than the single cone clutch. That design establishes greater synchronizer blocker ring clutch torque for a given degree of axially directed force on the synchronizer clutch sleeve. The basic design of the synchronizer clutch of the '208 patent, however, still requires a relatively costly and complex manufacturing and assembly procedure that is common to the design of the '900 patent since it too includes thrust bars and radial springs for loading the thrust bars.

Both the design of the '208 patent and the design of the '900 patent require costly precision machining. This is true also of prior art U.S. Pat. No. 3,414,098, as well as other prior art synchronizer clutch designs typically used in a manual transmission for an automotive vehicle.

BRIEF DESCRIPTION OF THE INVENTION

Our invention is adapted especially to be used in a transmission synchronizer clutch assembly that includes a synchronizer blocker ring manufactured in accordance with the teachings of copending application Ser. No. 08/116,780. As indicated in the copending application, it is common practice to manufacture synchronizer clutch assemblies with blocker rings that are formed of brass or that are formed by powdered metal casting techniques. The machining process needed for a brass blocker ring is inherently a costly manufacturing step, as are the powdered metal casting techniques.

As indicated in the copending application, the synchronizer blocker ring may be formed with an improved orbital forging process that comprises cold working flat carbon steel stock. All of the critical finished dimensions of the blocker ring are formed with the forging process as work hardening of the blocker ring is induced by the plastic deformation that occurs during the forging steps.

The carbon steel blocker ring formed by the forging process described in our copending application is adaptable for spot welding. It is this characteristic that makes it feasible to incorporate the improvements of our present invention in one embodiment of our invention.

The synchronizer clutch assembly of our invention, as in the case of conventional transmission synchronizer mechanisms of the kind described in the preceding paragraphs, includes a synchronizer clutch hub located directly adjacent a gear to be synchronized with respect to the shaft that carries the synchronizer hub. A clutch sleeve having internal clutch teeth is mounted on the synchronizer clutch hub for axial movement toward and away from the gear to be synchronized. The gear to be synchronized includes a cone clutch and external synchronizer teeth that are axially disposed with respect to internal clutch teeth on the sleeve. A blocker ring is disposed between the gear teeth and the internal teeth of the sleeve. A cone clutch surface is formed on the blocker ring and is adapted to frictionally engage the gear cone.

The synchronizer blocker ring of one embodiment of our invention is provided with angularly spaced spring elements that may be welded to an end face of the blocker ring. The spring elements are engageable by the clutch teeth of the sleeve as the sleeve is moved toward the gear to be synchronized. As the spring elements are compressed, a blocker ring cone clutch engaging force is created which energizes the friction cone clutch and causes the synchronizer blocker ring to index angularly relative to the synchronizer hub.

Although we have described in this specification a design in which the spring elements are spot welded to the blocker ring, we contemplate that other fastening techniques for the spring elements may be used; e.g., laser welding, riveting, etc.

In a second embodiment of our invention, the spring elements are formed as parts of an integral, circular spring member. The spring member includes a radial shoulder disposed on one axial side of the blocker ring. The spring elements, which extend axially from the radial shoulder, are formed with cam surfaces that are engageable by the synchronizer clutch sleeve teeth as the clutch sleeve is advanced toward the gear to be synchronized. Preferably, the spring member has a spring locating lip that engages the synchronizer ring to locate the spring member. Further, the spring elements preferably have an end clip that engages the synchronizer ring to keep the spring member axially fixed relative to the synchronizer ring.

In both of these embodiments of the invention, continued movement of the sleeve toward the gear will result in engagement of cone surfaces on the teeth of the blocker ring by cooperating cone surfaces on the leading edge of the sleeve clutch teeth, thereby creating a thrust force component on the cone clutch that changes the relative angular velocity of the gear to be synchronized until synchronism is established between the gear and the shaft. After synchronism is established, the sleeve may be moved through the blocker ring teeth into engagement with the gear teeth.

There is no necessity in our improved designs to provide multiple thrust bars, nor expander spring rings. This reduces the number of component elements of the clutch assembly, reduces the manufacturing costs, and simplifies the assembly procedure during manufacture. The spring elements can be secured by spot welding to the blocker rings following the forging of the blocker rings and prior to the assembly of the clutch.

A detent spring in the form of a circular ring is carried in an annular groove formed in the hub. It registers with an annular detent recess formed in the internal teeth of the sleeve when the sleeve is in a central position or a disengaged position with respect to the blocker ring. The detent action provided by the spring prevents inadvertent shifting movement of the sleeve relative to the blocker ring when the synchronizer clutch is disengaged, thereby preventing undesirable wear of relatively rotatable elements of the clutch assembly. The sleeve then will be prevented from moving when the clutch is in its neutral condition onto the synchronizer ring, thus reducing wear of the friction linings on the clutch surfaces.

Our improved design is characterized by an improved shift feel as the sleeve is moved by the manual shift mechanism toward the engaged position. A longer so-called lead-in time, beginning from the instant the shift is initiated until the chamfered teeth on the blocker ring are engaged, provides for improved shift feel and control of the synchronizer clutch mechanism. The longer lead-in time results, of course, from the increased axial movement or travel of the sleeve relative to the blocker ring as the blocker ring force is gradually increased upon deflection of the spring elements.

PARTICULAR DESCRIPTION OF THE INVENTION

Figure 1:
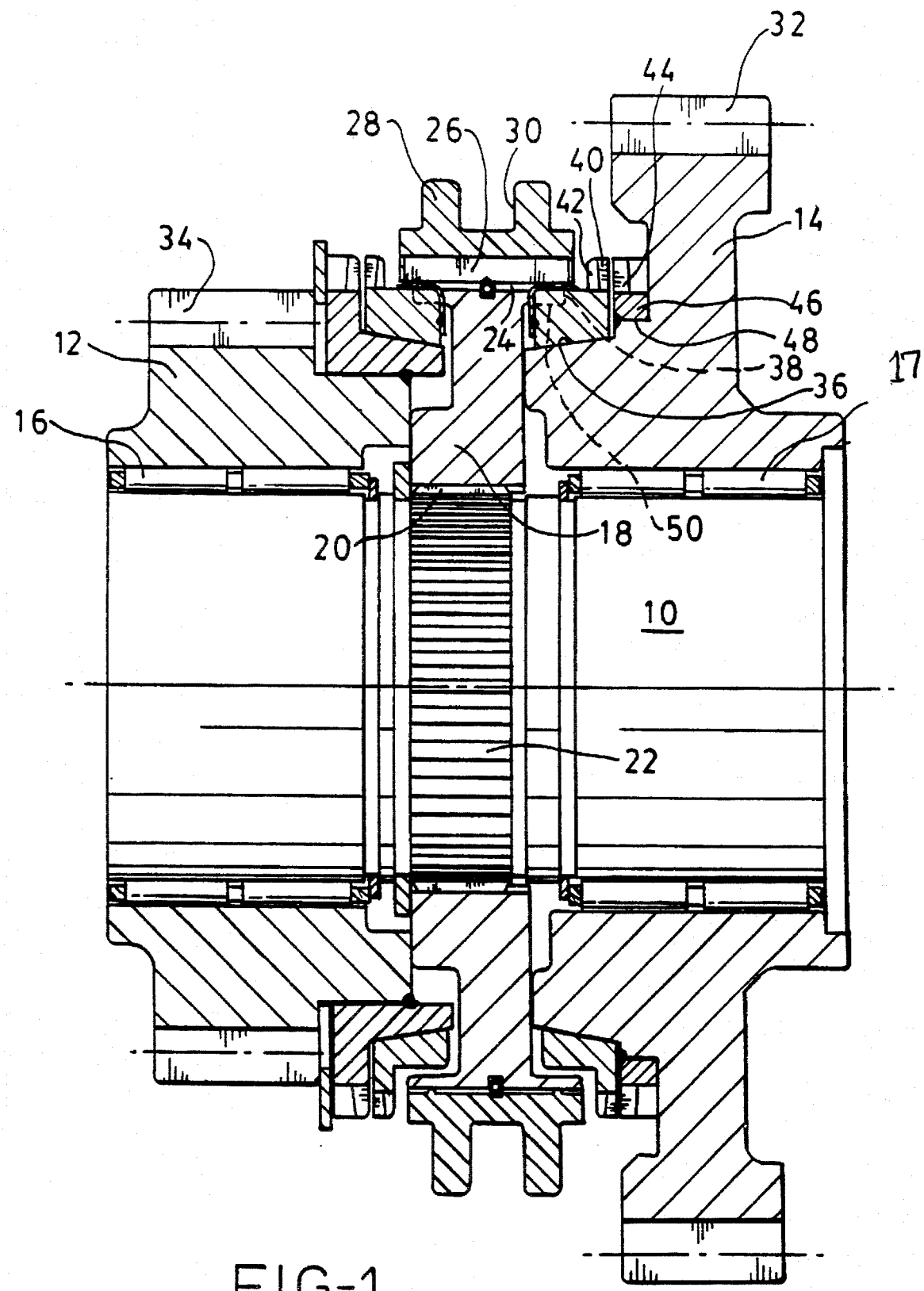
FIG. 1 is a cross-sectional view of a double-acting synchronizer assembly for a manual transmission incorporating the improvements of our invention.

Numeral 10 shows an intermediate shaft for a manual transmission. A small pitch diameter gear 12 and the large pitch diameter gear 14 are journalled on the shaft 10 by needle bearings 16 and 18, respectively. A synchronizer clutch hub 18 is splined at 20 to a spline portion 22 of the shaft 10. The periphery of the synchronizer clutch hub 18 is provided with external spline teeth 24 that register with internal teeth 26 of an axially movable synchronizer clutch sleeve 28. A groove 30 is formed in the sleeve 28 to receive shifter fork fingers that are carried by a shift fork rail for the manual transmission.

Large diameter gear 14 includes gear teeth 32 that mesh with external gear teeth formed on a cluster gear assembly for the transmission. The shift rail and the cluster gear assembly are not illustrated.

Small pitch diameter gear 12 includes external gear teeth 34 which, like the gear teeth 32, will mesh with countershaft cluster gear teeth.

Gear 14 is formed with a gear cone surface 36. A blocker ring 38 surrounds the gear cone 36 and is provided with an internal cone surface and meshes with the external cone surface of the cone 36. Blocker ring teeth 40 surround the periphery of the blocker ring 38. These teeth 40 are provided with lead-in chamfer surfaces 42. These blocker ring teeth are similar to blocker ring teeth with chamfers as taught by the prior art U.S. Pat. Nos. 2,221,900, 3,272,291 and 3,414,098 discussed previously.

Situated directly adjacent blocker ring 38 are gear teeth 44 formed on a ring 46 which is supported by gear 14 and secured to a shoulder 48 formed on the gear 14. Ring 46 is joined to the gear 14 by welding as indicated.

The teeth 26 of the sleeve, the teeth 40 of the blocker ring, and the teeth 44 of the gear are in axial alignment. An axial projection on the synchronizer hub is received in a recess 50 formed in the blocker ring. The projection is of lesser width in a peripheral direction than the width of the slot within which it fits so that a relative angular lost motion is possible between the blocker ring and the hub.

Figure 1A:
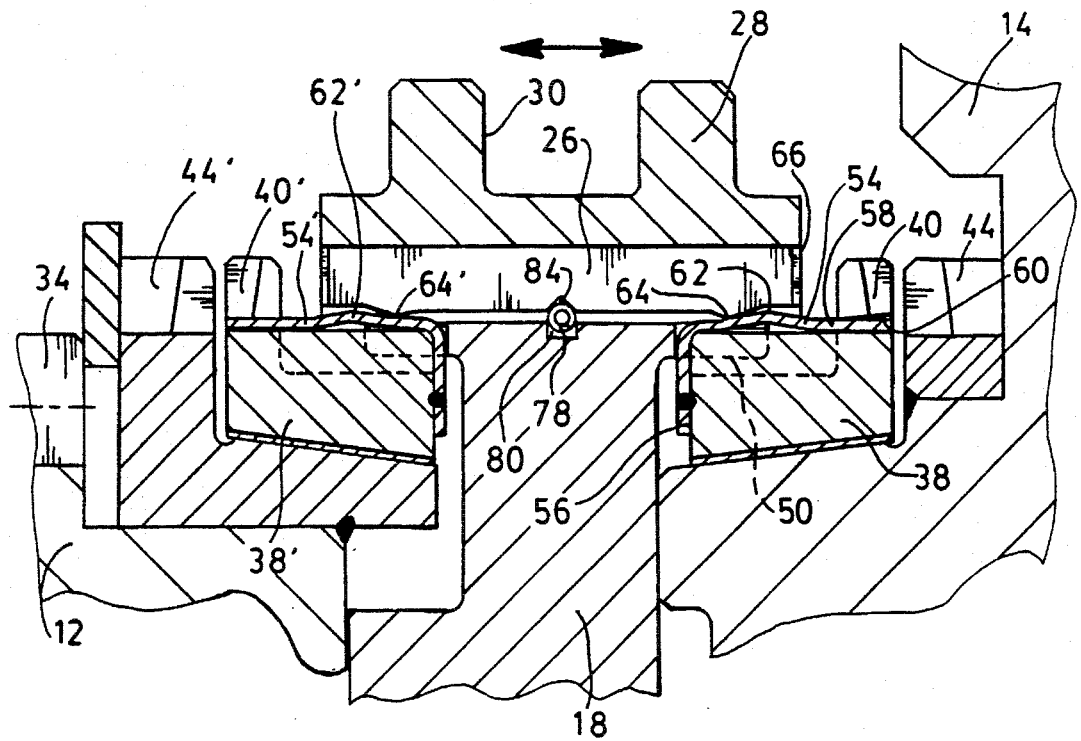
FIG. 1A is an enlargement of a portion of the cross-sectional view of FIG. 1.

As best seen in FIG. 1A, a spring element 54 is secured to one side 56 of the blocker ring 38. The spring, which is generally of right-angle cross-section, includes a portion 58 that surrounds the blocker ring 38, as indicated. The extremity of the spring portion 58 extends through a slotted opening 60 in the teeth 40 for the blocker ring so that the spring and the blocker ring rotate together, although axial shifting movement of the end of the spring portion 58 relative to the blocker ring is accommodated by the spring 60.

The spring portion 54 has a raised portion 62, as indicated in FIGS. 1A. The clutch teeth 26 of the sleeve 28 are provided with a ramp portion 64 which engages the raised portion 62 when the sleeve 28 is shifted in a right-hand direction as viewed in FIG. 1A. The spring portion 54 is compressed by the ramp portion 64 as the sleeve 28 continues to move in a right-hand direction. When the ramp portion 64 passes over the raised portion 62, the leading edge 66 of the teeth 26 begins to engage the chamfered leading edge of the blocker ring teeth 40. The axial force on the sleeve 28, upon engagement of the blocker ring teeth 40, will establish a clutching force on the blocker ring, thereby imparting a synchronizing torque on the gear 14. When the gear and the synchronizer clutch hub 18 are in synchronism, the sleeve teeth 26 may move through the blocker ring teeth into engagement with the teeth 44 on the gear 14, thereby locking the intermediate shaft 10 to the gear 14. The initial force caused by engagement of the sleeve teeth with the spring portion 54 will cause the blocker ring to index to the angular extent permitted by the lost motion connection provided by the projection and slot shown in part at 50.

The gear 12 has a synchronizer blocker ring similar to the one described with reference to gear 14. This blocker ring is located on the left side of the clutch hub 18, as indicated in FIG. 1A. The elements of the synchronizer clutch elements associated with gear 12 have been indicated by the same reference numerals used to describe the synchronizer clutch associated with gear 14, although prime notations are added. The synchronizer elements associated with gear 12 function in the same manner as the synchronizer elements associated with gear 14.

The spring portions 54 and 54' are flexible, as described. The portions that are secured to the blocker rings are welded to the blocker rings, preferably by spot welding. The blocker rings are formed in a manner described in the copending patent application Ser. No. 08/116,780 described above. They are made of carbon steel and they are forged by the orbital forging process described in that copending application. Because they are formed of carbon steel, spot welding of the spring elements is feasible. That would not be the case, of course, if these blocker rings were of the kind described in prior art references, since it is usual practice to form blocker rings of brass or of powdered metal.

Figure 2:
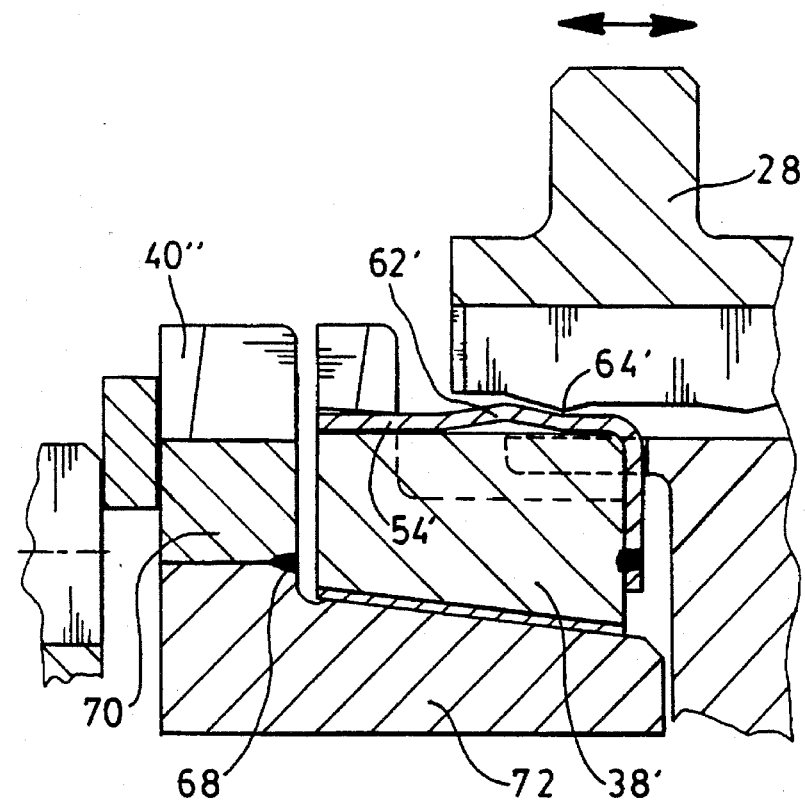
FIG. 2 is an enlargement of a portion of the cross-sectional view of FIG. 1 showing the synchronizer assembly with the synchronizer sleeve in the neutral position.

FIG. 2 shows the basic design described with reference to FIG. 1, but the gear cone is formed of two parts that are secured together by welding, as shown at 68. The first part of the gear cone shown at 70 carries gear teeth 40". Part 70 is adjoined by the welding 68 to the cone portion 72.

FIG. 2 shows the sleeve in its neutral position with the projection 64 displaced from the raised portion 62' of the spring portion 54'.

Figure 3:
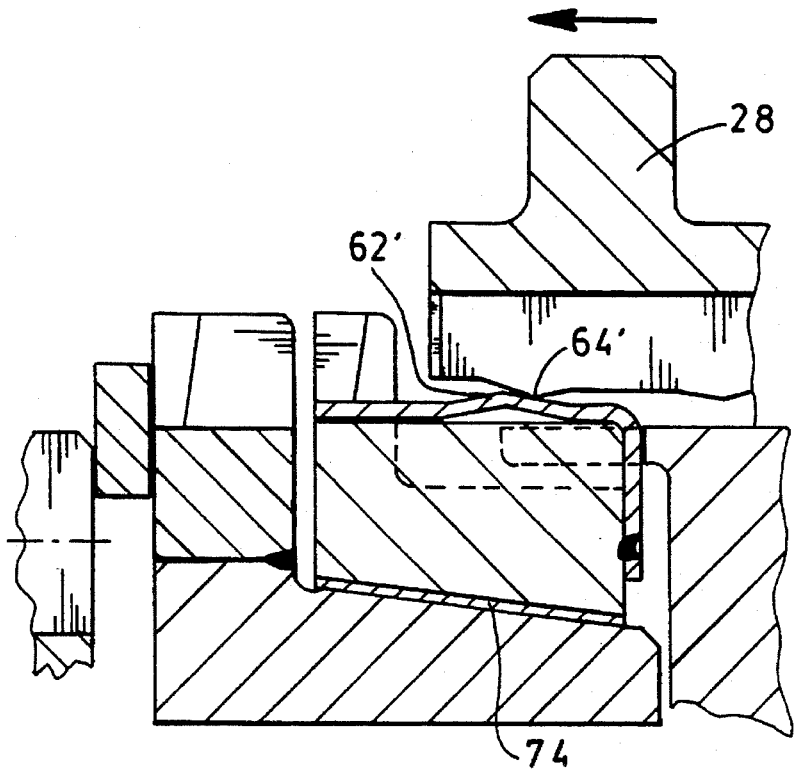
FIG. 3 is a view similar to FIG. 2 showing the sleeve in a position intermediate the neutral position and the engaged position at the beginning of the synchronizing action.

FIG. 3 shows the sleeve 28 in the position it assumes at the beginning of the synchronizing action as the projection 64' engages the ramp surfaces of the raised portion 62'. This creates an engaging force on the friction cone surfaces between which friction material 74 is disposed.

Figure 4:
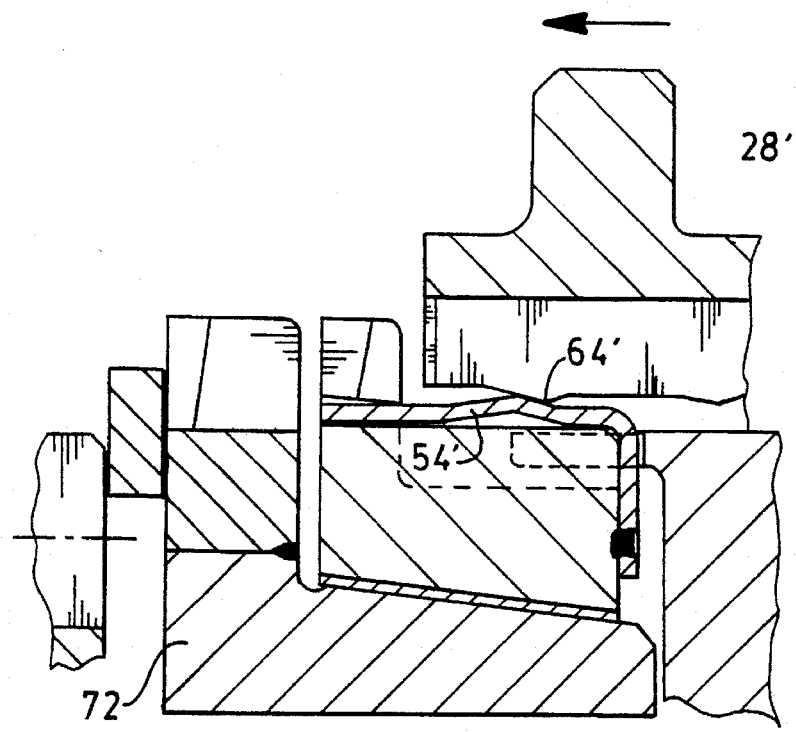
FIG. 4 is a view similar to FIGS. 2 and 3, although the sleeve is moved to a position that depresses the synchronizer spring.

FIG. 4 shows a sleeve in the position it assumes when the spring portion 54' is compressed as the sleeve continues moving toward the clutch engaging position. The synchronizing torque applied to the blocker ring then increases, causing the blocker ring to index relative to the hub. The synchronizing torque is applied also to the gear cone 72 to be synchronized.

Figure 5:
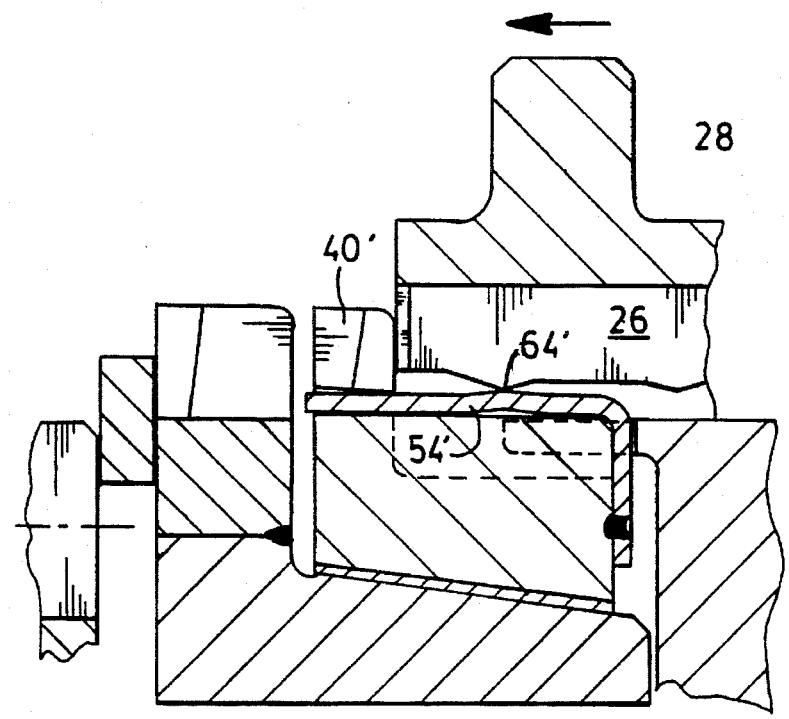
FIG. 5 is a view similar to FIGS. 1–4 showing the sleeve as it begins to engage the chamfered teeth of the blocker ring.

Continued movement of the sleeve 28 will cause the spring portion 54' to be compressed to the position shown in FIG. 5 as the leading edge of the sleeve teeth 26 begins to engage the chamfered leading edges of the blocker ring teeth 40'. The axial component of the reaction torque applied to the blocker ring by the sleeve teeth acting on the chamfered ends of the blocker ring teeth will cause the cone clutch surfaces to engage and to transfer synchronizing torque to the gear 14 to be synchronized.

Figure 6:
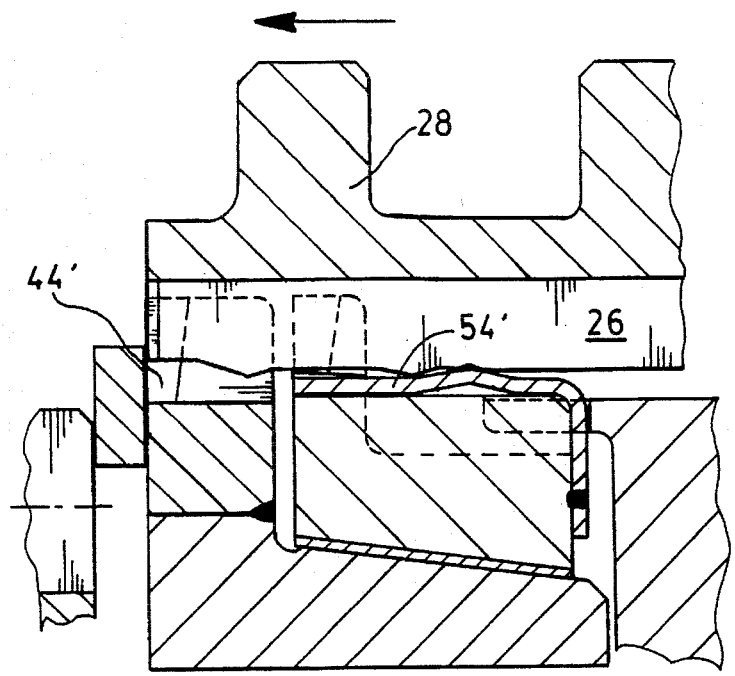
FIG. 6 is a view similar to FIGS. 2–5 showing the sleeve after it has passed through the blocker ring into engagement with the gear teeth of the gear to be synchronized.

As the projection 64' passes over the raised portion 54', the slope of the raised portion 54' reverses, thereby causing an axial component of the spring force to urge the blocker ring to a clutch disengaging position. This occurs as the leading edge of the teeth 26' engage the chamfered leading edges of the blocker ring teeth 40'. When the sleeve 28 reaches the position shown in FIG. 6, the teeth 26 will have passed through the blocker ring teeth into engagement with the gear teeth 44'. A reverse reaction force acting on the spring portion 54' then will facilitate disengagement of the blocker ring cone clutch surface from the cooperating cone surface of the gear cone.

Shown in FIG. 1A is a detent spring 78 which encircles the hub 18. It is received in a hub recess 80 and is adapted to engage a circular groove 84 formed at the outer diameter of the teeth 26. This provides a spring detent action between the sleeve 28 and the hub 18. The sleeve thus is precisely located in the proper neutral position when the synchronizer is disengaged. This prevents movement of the sleeve toward the blocker rings, which might cause wearing away of the friction linings on the cone surfaces.

The synchronizer blocker ring, as mentioned previously, may be manufactured by the orbital forging process described in copending application Ser. No. 08/116,780. We contemplate that the gear tooth rings in each of the embodiments described in this specification also may be formed by the orbital forging process used in the formation of the synchronizer rings. After the gear tooth rings are formed, they may be welded, as described previously, to the associated gear 12 or 14. The cone surface for the gear tooth ring for each of the gears 12 and 14 can be formed during the forging process as in the case of the synchronizer rings.

In the embodiment of the invention described herein with reference to FIGS. 1 and 1A, the clutch tooth ring is formed integrally with the gear cone. That integral assembly also can be formed by the same orbital forging operation described in the aforesaid copending application.

Figure 8:
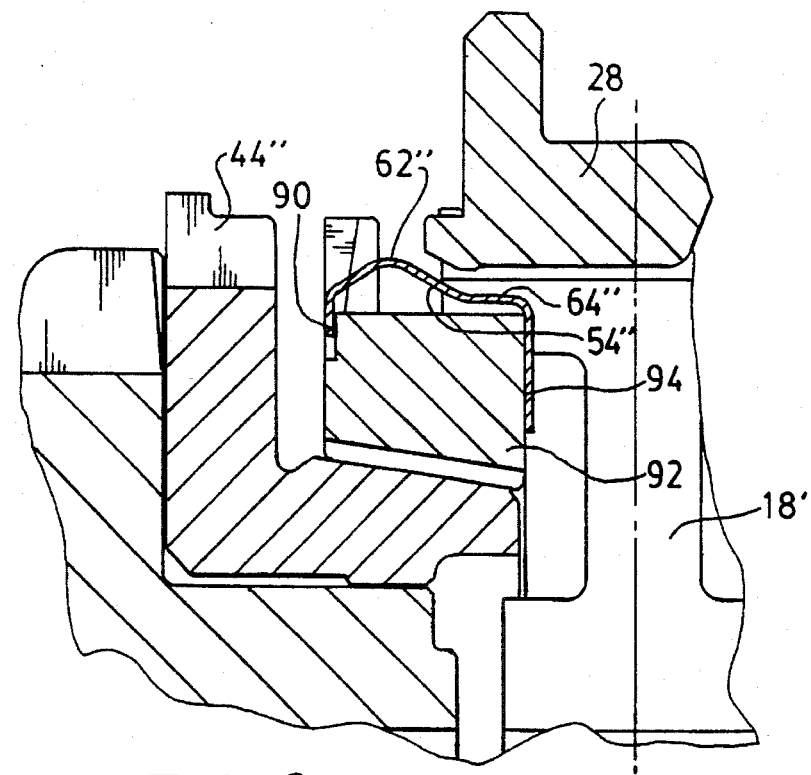
FIG. 8 is a cross-sectional view of the second embodiment of our invention, the synchronizer sleeve being shown in the neutral, retracted position.
Figure 9:
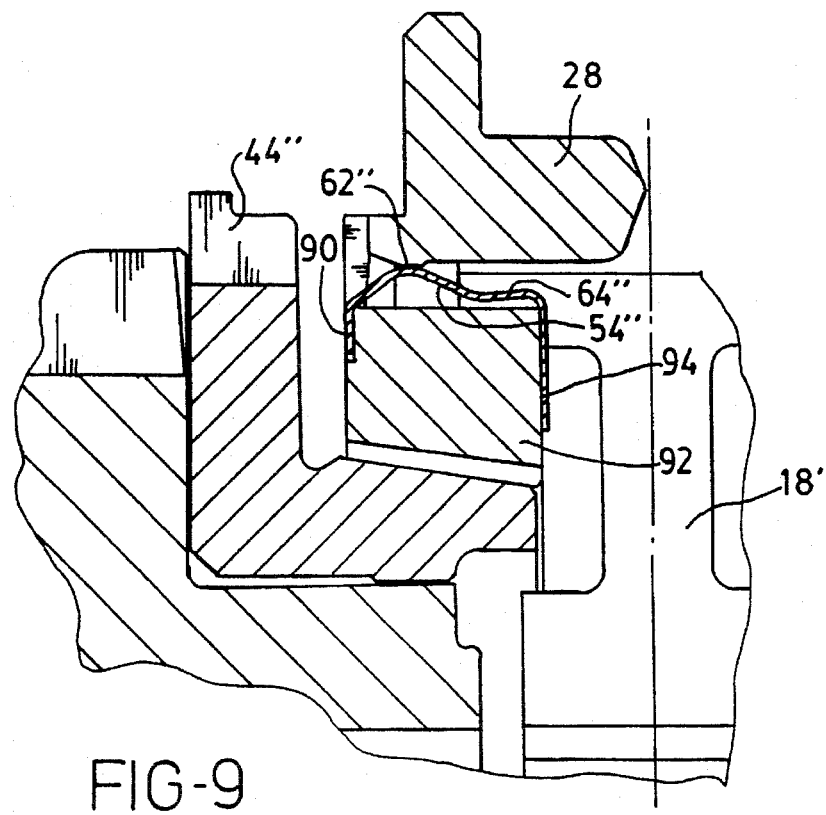
FIG. 9 is a cross-sectional view of the second embodiment of our invention wherein the synchronizer sleeve is shown in a partially advanced position as it engages and radially deforms the spring elements.
Figure 7:
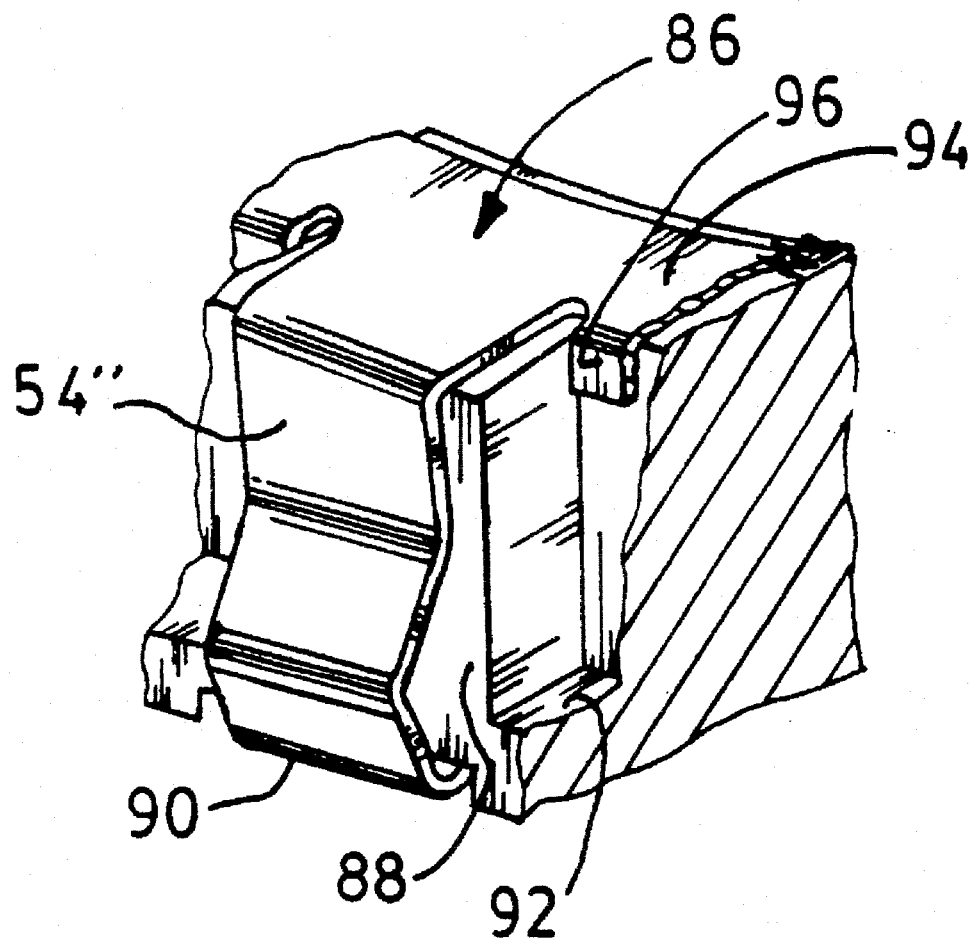
FIG. 7 is an isometric view of a second embodiment of our invention, which includes a single-piece spring assembly.

FIGS. 7, 8 and 9 show an alternate embodiment of the invention wherein the spring elements 54" form a part of a one-piece annular spring that is identified generally by reference numeral 86. The spring elements 54" may be located directly adjacent a projection 88 extending from synchronizer blocker ring 92. The end of the spring elements 54" can be clipped over the edge of the blocker ring 92, as shown at 90 in FIGS. 7, 8 and 9, in order to hold the one-piece spring 86 axially fast.

The blocker ring teeth are not illustrated in FIG. 7 since the spring elements 54" may be located in a gap in the blocker ring teeth.

The projection 88 is received in a slot formed in the synchronizer hub 18'. This forms a lost-motion connection similar to the projection in the slot arrangement illustrated in FIG. 1A at 50.

The one-piece spring 86 comprises an annular, radially disposed portion 94, as seen in FIGS. 7, 8 and 9. The spring 86 is formed with a locating lip, as indicated at 96 in FIG. 7. This locates the ring radially with respect to the synchronizer blocker ring 92.

The function of the spring elements 54" are the same as the functions of the spring elements described with respect to the embodiments of FIGS. 1–6. The spring elements 54" are deformed as the sleeve 28 is moved axially toward the synchronizer blocker ring teeth. The neutral position for the synchronizer clutch is indicated in FIG. 8 where the sleeve 28 is in a retracted position out of engagement with respect to the spring elements 54". FIG. 9 illustrates the synchronizer clutch assembly of FIG. 8 as the sleeve 28 is advanced partially into engagement with the chamfered leading edges of the synchronizer blocker ring teeth. As it moves into engagement with the synchronizer blocker ring teeth, the spring elements create a force on the cone clutch, thereby establishing a cone clutch engagement force.

The one-piece construction does not require the welding step described with reference to the embodiments of FIGS. 1–6. The radial portion 94 imparts a synchronizer clutch engaging force on the synchronizer blocker ring due to the axial component of the forces on the spring elements created by the engagement of the internal teeth of the sleeve 28 with the spring elements 54".

Having described preferred embodiments of our invention, what we claim and desire to secure by U.S. Letters Patent is:

1. A synchronizer clutch assembly for a manual transmission comprising torque transfer gears, a torque delivery shaft, at least one of said gears being journalled for rotation about the axis of said shaft, said clutch assembly comprising:

a clutch hub secured to said shaft, a clutch sleeve secured to said hub and adapted for axial shifting movement relative to said hub;

a blocker ring between said one gear and said hub, clutch teeth on said sleeve and on said one gear, blocker ring gear teeth between said sleeve clutch teeth and gear clutch teeth, said blocker ring and said one gear having engageable friction clutch surfaces; and a spring element in cooperative engagement with said blocker ring including an axially disposed flexible portion engageable with said sleeve teeth as said sleeve is moved toward said blocker ring gear teeth whereby a clutch surface engaging force is developed on said blocker ring upon deflection of said spring element.

2. The combination as set forth in claim 1 wherein said spring element is secured to said blocker ring by welding.

3. The combination as set forth in claim 1 wherein said clutch teeth on said sleeve are internal clutch teeth, and further comprising least one radially inward projection on said internal clutch teeth, and at least one radially outward projection on said spring element engageable with said internal clutch teeth projection upon axial movement of said sleeve toward said blocker ring whereby said spring element is compressed radially thus imparting a clutch surface engaging force on said blocker ring.

4. The combination as set forth in claim 1 wherein said axially disposed flexible portion defines a pair of oppositely disposed ramp surfaces of opposite slope, said sleeve clutch teeth having a ramp surface engaging portion, said sleeve imparting a friction clutch engaging thrust to said blocker ring as said ramp surface engaging portion of said sleeve clutch teeth engages one ramp surface, said spring element creating a friction clutch disengaging force on said blocker ring as said ramp surface engaging portion of said sleeve clutch teeth engages the other of said ramp surfaces.

5. The combination as set forth in claim 2 wherein said clutch teeth on said sleeve are internal clutch teeth, and further comprising at least one radially inward projection on said internal clutch teeth, and at least one radial projection on said spring element engageable with said internal clutch teeth projection upon axial movement of said sleeve toward said blocker ring whereby said spring element is compressed radially thus imparting a clutch surface engaging force on said blocker ring.

6. The combination as set forth in claim 2 wherein said spring element includes a first portion on one side of said blocker ring and a second portion extending axially over said blocker ring, said second portion being formed with a radially extending portion defining ramp surfaces, said radially extending portion being deflected radially inward by said sleeve clutch teeth upon axial movement of said sleeve and said first portion being welded to said axial side of said blocker ring.

7. A synchronizer clutch assembly for a manual transmission comprising torque transfer gears, a torque delivery shaft, at least one of said gears being journalled for rotation about the axis of said shaft;

said clutch assembly comprising a clutch hub secured to said shaft, a clutch sleeve secured to said hub and adapted for axial shifting movement relative to said hub;

a blocker ring between said one gear and said hub, clutch teeth on said sleeve and on said one gear, blocker ring gear teeth between said sleeve clutch teeth and gear clutch teeth, said blocker ring and said one gear having engageable friction clutch surfaces; and a spring member having at least one spring element which cooperates with said blocker ring including a flexible portion adapted to engage said sleeve teeth as said sleeve is moved toward said blocker ring gear teeth whereby a friction clutch surface engaging force is developed on said blocker ring upon radial deflection of said spring element;

said spring member having a radially disposed portion located between said blocker ring and said hub, said radially disposed portion being adapted to transfer said friction clutch engaging force to said blocker ring;

said spring element having an end portion defining a spring retaining clip that engages said blocker ring, thereby holding said spring axially fast when it is assembled on said blocker ring.

8. The combination as set forth in claim 7 wherein said flexible portion of said spring element defines a pair of oppositely disposed ramp surfaces of opposite slope, said sleeve clutch teeth having a ramp surface engaging portion, said sleeve imparting a friction clutch engaging thrust to said blocker ring as said ramp surface engaging portion of said sleeve clutch teeth engages one ramp surface, said spring element creating a friction clutch disengaging force on said blocker ring as said ramp surface engaging portion of said sleeve clutch teeth engages the other of said ramp surfaces.

9. The combination as set forth in claim 7, wherein said spring element is secured to said blocker ring.

10. The combination as set forth in claim 1, wherein said spring element is secured to said blocker ring.

11. A synchronizer clutch assembly for a manual transmission comprising torque transfer gears, a torque delivery shaft, at least one of said gears being journalled for rotation about the axis of said shaft;

said clutch assembly comprising a clutch hub secured to said shaft, a clutch sleeve secured to said hub and adapted for axial shifting movement relative to said hub;

a blocker ring between said one gear and said hub, clutch teeth on said sleeve and on said one gear, blocker ring gear teeth between said sleeve clutch teeth and gear clutch teeth, said blocker ring and said one gear having engageable friction clutch surfaces; and a spring member having at least one spring element which cooperates with said blocker ring including a flexible portion adapted to engage said sleeve teeth as said sleeve is moved toward said blocker ring gear teeth whereby a friction clutch surface engaging force is developed on said blocker ring upon radial deflection of said spring element;

said spring member having a radially disposed portion located between said blocker ring and said hub, said radially disposed portion being adapted to transfer said friction clutch engaging force to said blocker ring;

said spring element having a locating lip on said radially disposed spring portion, thereby maintaining said spring member and said blocker ring radially fast.

* * * * *